Oct. 24, 1933. R. R. HOLDEN Re. 18,977

TROLLEY GUIDE

Original Filed Oct. 10, 1930 3 Sheets-Sheet 1

Inventor:
Richard Roy Holden.
By Jones, Addington, Ames & Seibold. Attys.

Oct. 24, 1933. R. R. HOLDEN Re. 18,977

TROLLEY GUIDE

Original Filed Oct. 10, 1930 3 Sheets-Sheet 2

Inventor:
Richard Roy Holden.
By Jones, Addington,
Ames & Seibold. Attys.

Oct. 24, 1933. R. R. HOLDEN Re. 18,977

TROLLEY GUIDE

Original Filed Oct. 10, 1930 3 Sheets-Sheet 3

Inventor:
Richard Roy Holden.
By Jones, Addington,
Ames & Seibold. Attys.

Reissued Oct. 24, 1933

Re. 18,977

UNITED STATES PATENT OFFICE 18,977

TROLLEY GUIDE

Richard Roy Holden, Highland Park, Ill.

Original No. 1,806,164, dated May 19, 1931, Serial No. 487,671, October 10, 1930. Application for reissue March 28, 1932. Serial No. 601,660

31 Claims. (Cl. 191—37)

This invention relates to a trolley wire positioning member and has special reference to trolley cross-overs, switches, frogs and the like.

More particularly, this invention relates to a two-piece trolley wire positioning member comprising an upper or supporting portion which is adapted to be permanently attached to the crossing or connecting trolley wires and a lower portion which is adapted to be easily removed when such is desirable.

With cross-overs, switches and the like, made in one piece, as is generally done, if any part is defective or becomes worn the whole device must be removed and replaced. Furthermore, the means usually employed for securing the cross-overs, switches and the like in position with respect to the trolley wires comprise clamps, bolts and nuts, thereby making it quite an operation to fasten or remove these members.

The present device provides a two-piece trolley positioning member in which the upper or supporting portion is adapted to be permanently attached to the trolley wires, it being only necessary to remove this portion when the trolley wires are themselves taken down or replaced. This upper portion may be provided with novel means whereby it may be easily and quickly attached to the trolley wires without the use of any clamps, bolts or the like. A lower member which includes the trolley runners and approaches is adapted to be positioned under the upper member and secured in place by merely clamping the approaches over the trolley wires. With this construction, the lower member which receives the greatest wear may be easily removed by merely spreading the clamped ends of the approaches.

An object of this invention is to provide a two-piece trolley wire positioning member in which the upper portion is adapted to be permanently attached to the wires while the lower portion which receives substantially all the wear may be easily removed and replaced.

A further object of this invention is to provide a trolley wire positioning member having novel securing means and which may be easily and securely attached to the trolley wires without the use of securing clamps, bolts and the like.

A still further object is to provide a construction which will gradually damp the vibrations of the trolley wire in and adjacent the device.

Further objects and advantages will be apparent from the following description taken together with the accompanying drawings in which latter:

Figure 1:
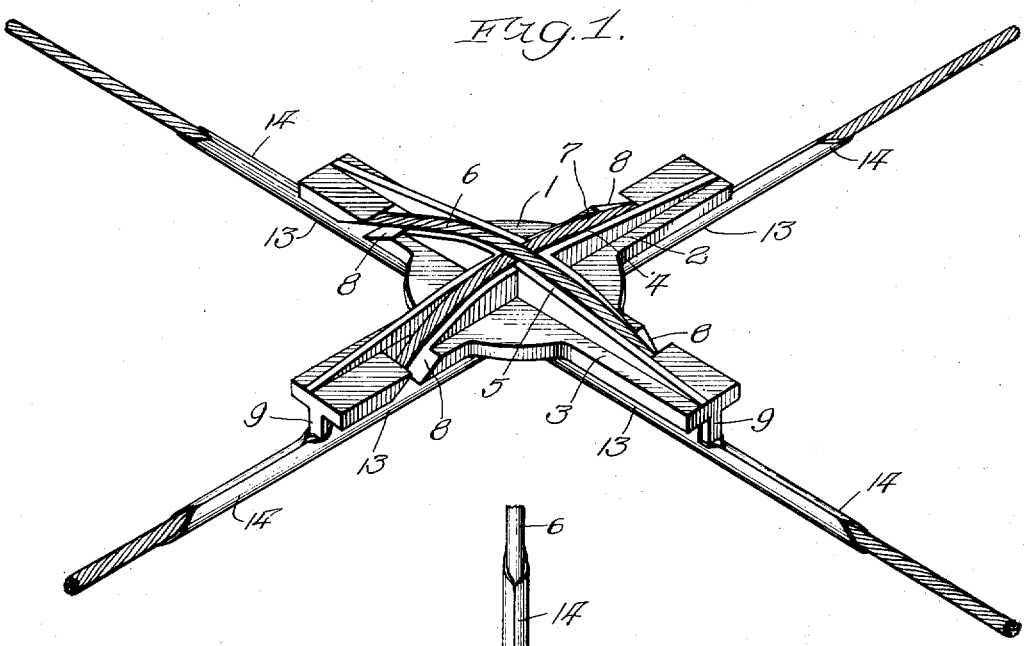
Figure 1 is a perspective view of an embodiment of the present invention assembled in connection with crossed trolley wires.
Figure 2:
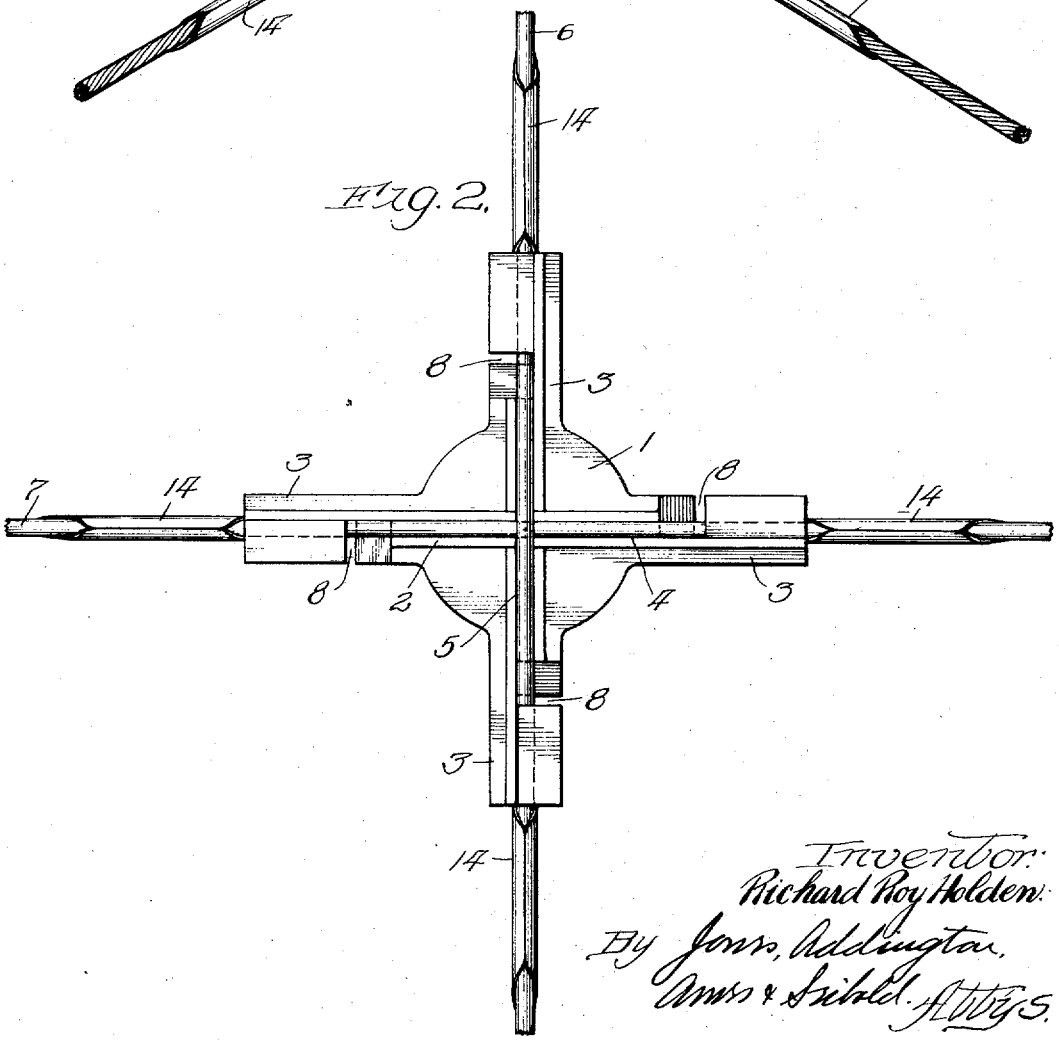
Fig. 2 is a top plan view of the device shown in Fig. 1.
Figure 3:
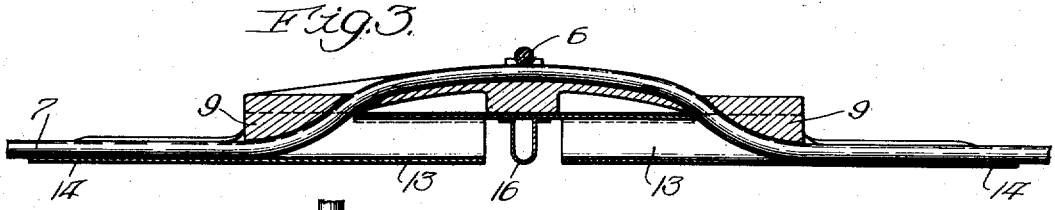
Fig. 3 is a central vertical cross sectional view.
Figure 4:
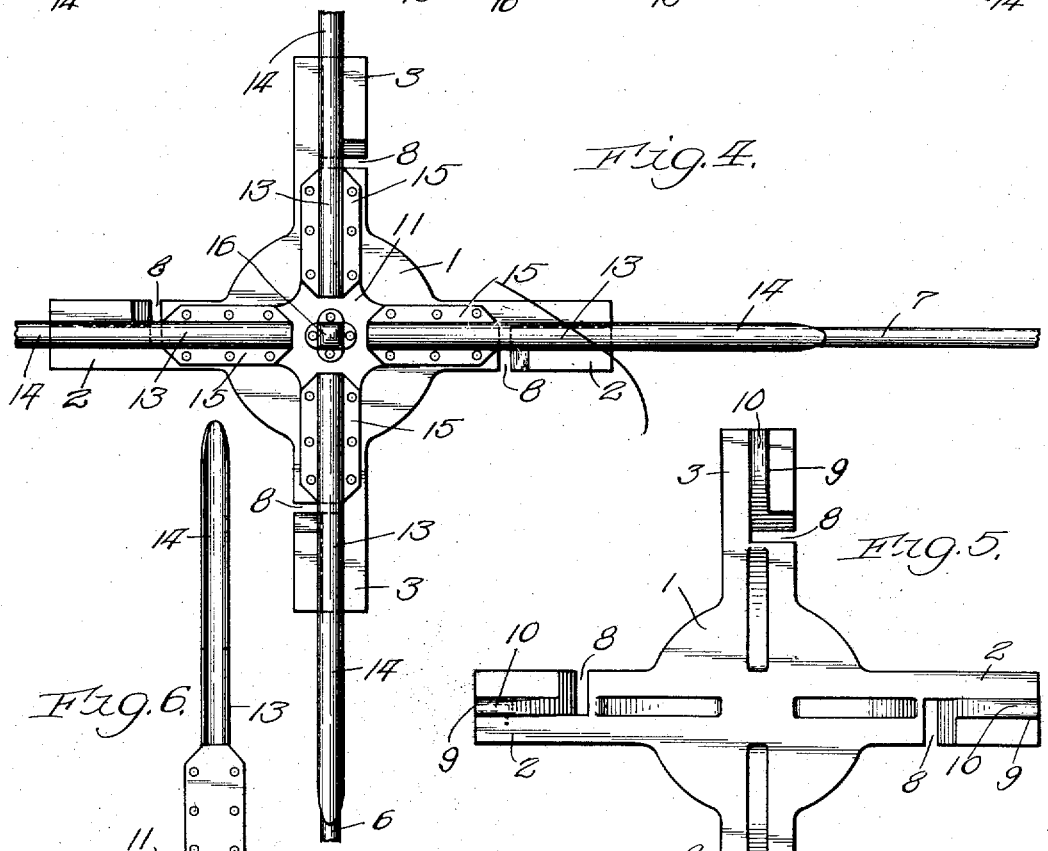
Fig. 4 is a bottom plan view of the device.
Figure 5:
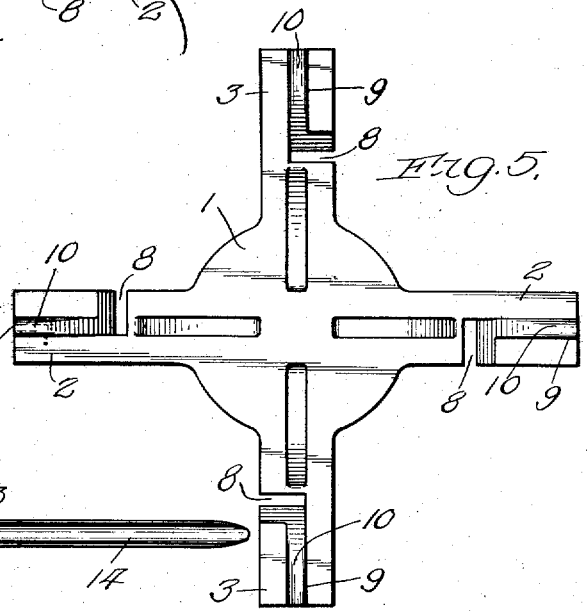
Fig. 5 is a bottom plan view of the upper portion of the device.
Figure 6:
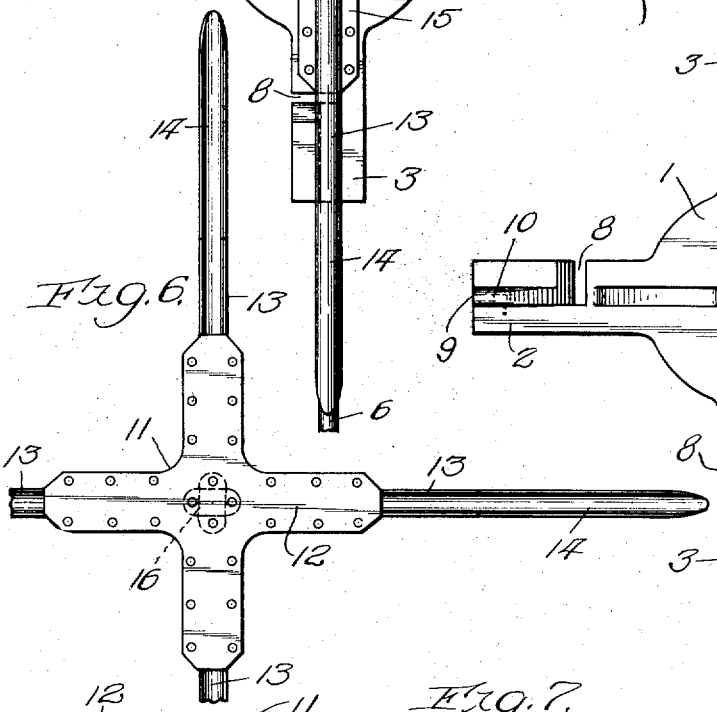
Fig. 6 is a partial top plan view of the lower portion.
Figure 7:
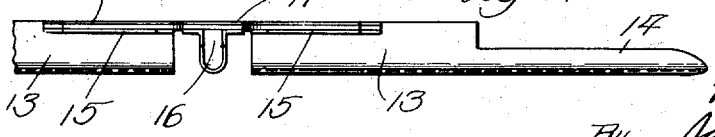
Fig. 7 is a partial side elevational view of the lower portion.

Referring more particularly to the drawings, the construction shown in Figs. 1 to 7 comprises an upper member 1 which may have crossed arms 2 and 3. The upper cross arm member 1 may be provided with upwardly bowed channels 4 and 5, the channel 5 extending upwardly above the channel 4 so that the trolley wire 6 will cross above the trolley wire 7. Notches or slots 8 may be provided in the arms 2 and 3 adjacent the outer ends of the upwardly bowed channels 4 and 5. These notches 8 extend inwardly from the sides of the arms and are formed on opposite sides of the arms so that all the slots extend into the arms in either a clockwise or counter-clockwise direction.

Downwardly extending curved portions 9 having channels 10 in the bottom sides thereof may be formed at the outer ends of the upper cross arm member 1 and are preferably formed integrally with the upper member 1. With this construction to fasten the upper cross arm member 1 to the crossed trolley wires 6 and 7, it is only necessary to slide the trolley wire 7 inwardly in the slots 8 so that the wire lies in the upwardly bowed channel 4 and the channels 10 in the downwardly extending curved portions 9. The same operation is then repeated with respect to the other trolley wire and the arm 3. When thus attached, the upper member 1 is securely fastened to the crossed trolley wires and no further securing means are necessary.

Figure 8:
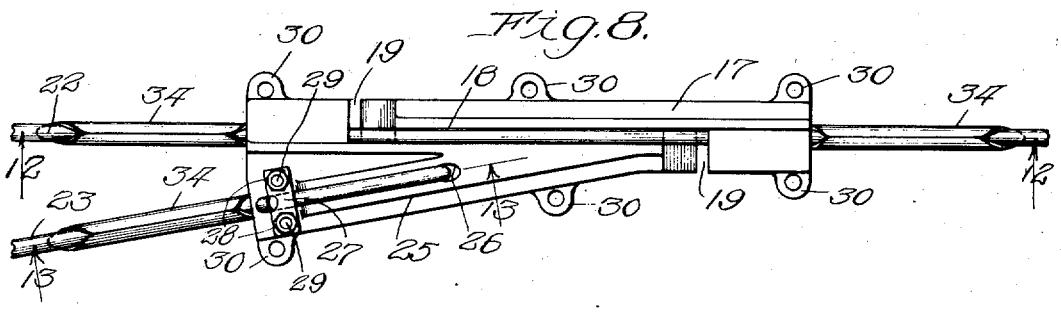
Fig. 8 is a top plan view of a trolley frog or switch embodying the present invention assembled in connection with connecting trolley wires.
Figure 9:
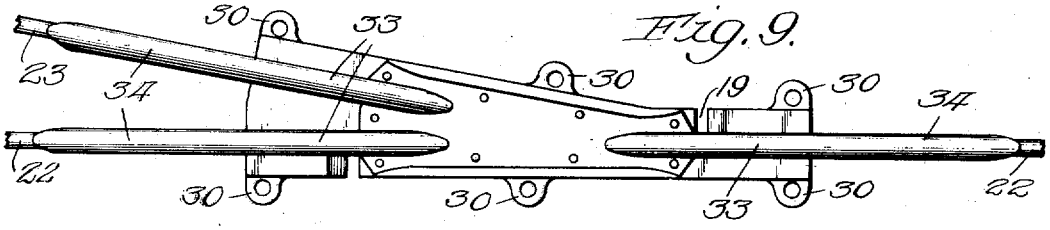
Fig. 9 is a bottom plan view of the device shown in Fig. 8.
Figure 10:
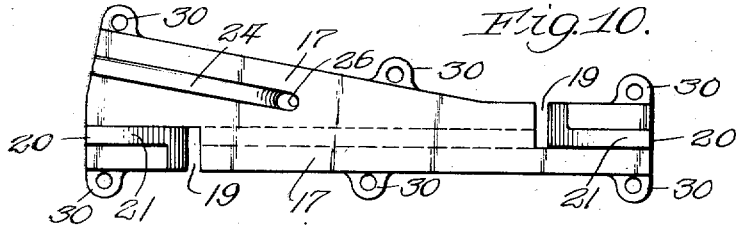
Fig. 10 is a bottom plan view of the upper portion of the device shown in Fig. 8.
Figure 11:
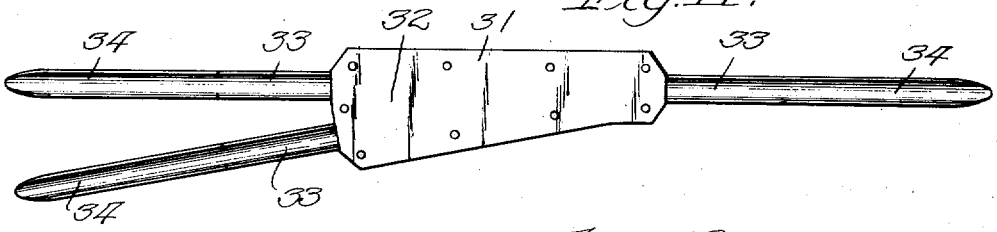
Fig. 11 is a top plan view of the lower portion of the device shown in Fig. 8.
Figure 12:
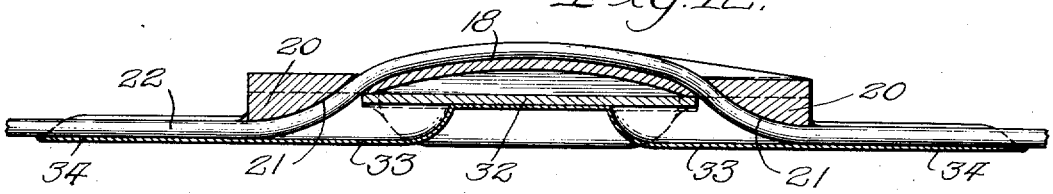
Fig. 12 is a cross sectional view taken on the line 12—12 of Fig. 8.
Figure 13:
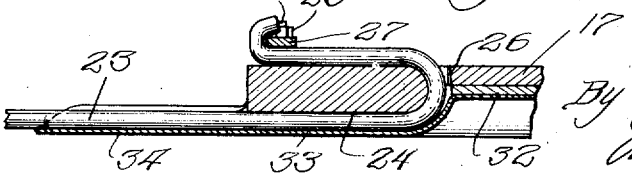
Fig. 13 is a cross sectional view taken on the line 13—13 of Fig. 8.

The lower cross arm member 11 comprises a central portion or plate 12 which may be in the form of a cross. U-shaped trolley runners 13 having approach portions 14 are secured to the lower side of the plate 12 with the open side facing upwardly. Any means may be employed for fastening the runners 13 to the plate 12 such as riveting the plate to outwardly extending flange portions 15 of the runners 13 or they may be formed integrally with the plate. When the approach portions 14 of the runners 13 are peened or clamped about the trolley wire, the rigidly constructed lower member serves to gradually dampen the vibrations of the trolley wire as the vibrations progress toward the plate or central portion thereby eliminating vibration points where the wire tends to crystalize and eventually break. This is especially true if the wire is dead-ended as shown in Figs. 8 to 13. A lug 16 may be secured to the plate 12 between the inner ends of the runners 13 by any desirable means. This lug 16 serves to guide the trolley between the inner ends of the runners 13. To secure the lower member 11 to the upper member 1 after the latter has been properly fastened to the trolley wires, the lower member 11 is positioned under the upper member 1 so that the downwardly extending curved portions 9 will fit between the upwardly extending sides of the runners 13. The upper sides of the approach portions 14 are then clamped together over the trolley wires. This securely holds the lower portion 11 in place and will prevent any movement thereof with respect to the upper portion 1.

Although the cross-over is shown and described as having the arms rigidly fixed at right angles to each other, it is evident that the arms may be placed at any angle or may be adjustable. This construction may also be used with any number of arms to take care of two or more crossing trolley wires.

Figs. 8 to 13 show a trolley switch or frog embodying the present invention. This switch or frog comprises an upper or supporting member 17 which may have a longitudinally extending upwardly bowed channel 18 with slots 19 extending inwardly from opposite sides of the supporting member 17 adjacent the ends of the upwardly bowed channel 18. These slots 19, as well as the slots 8 previously described, are cut at an angle to the plane of the supporting members 1 and 17 so that the edges thereof will not cut or wear the trolley wires at the point of contact. Downwardly extending curved portions 20, similar to the downwardly extending curved portions 9 may be secured to the under side of the supporting portion 17 and are provided with downwardly facing channels 21. Trolley wire 22 would be positioned with respect to the supporting member 17 in the manner previously described in positioning the cross-over.

The connecting trolley wire 23 may be positioned in the channel 24 in the bottom of the outwardly extending portion 25 of the supporting portion 17 and is then bent up through the slot 26 after which it is doubled back on top of the portion 25 and secured by the plate 27 which is clamped over the end thereof by means of nuts 28 threading onto the upwardly extending bolts 29. In order to hold the upper portion 17 in place and use the same as a strain plate, ears 30 may be provided to which guy wires may be secured.

The lower portion 31 of the switch or frog may comprise a guide plate 32 having runner portions 33 extending outwardly therefrom which are adapted to engage the trolley wires. Approach portions 34 are provided on the end of the runners 33 and are preferably formed integrally therewith. The lower portion 31 is secured to the upper portion 17 in a manner similar to that employed in fastening the lower portion 11 of the cross-over to the upper portion 1. The downwardly extending curved portions 20 fit between the upper sides of the runners 33 and the approach portions 34 are then clamped over the trolley wires.

While I have shown and described but two embodiments of the present invention, it will be apparent to those skilled in the art that various modifications thereof may be made without departing from the spirit and scope of this invention and, therefore, I wish to be limited only by the scope of the prior art and the appended claims.

I claim:

1. A trolley guide comprising an upper member for positioning the trolley wires and a lower member for guiding a trolley, the upper member having a channel in its upper side to receive a trolley wire, and having means adjacent the ends of said channel for holding the wire down in said channel.

2. A trolley guide comprising an upper member for positioning the trolley wires and a lower member for guiding a trolley, the upper member having an upwardly bowed channel in its upper side to receive a trolley wire, and having means formed therein adjacent the ends of said channel for holding the wire down in said channel.

3. A trolley guide comprising an upper member for positioning the trolley wires and a lower member for guiding a trolley, said upper member having an upwardly bowed channel in its upper side to receive a trolley wire and having slots therein for holding the wire down in said channel.

4. A trolley guide comprising an upper member for positioning the trolley wires and a lower member for guiding a trolley, said upper member having an upwardly bowed channel in its upper face to receive a trolley wire and having slots extending inwardly from the sides thereof adjacent the outer ends of said upwardly bowed channel for holding the wire down in said channel.

5. A trolley guide comprising an upper member for positioning the trolley wires and a lower member for guiding a trolley, said upper member having an upwardly bowed channel in its upper face to receive a trolley wire and having downwardly facing channels adjacent the ends of said upwardly bowed channel for receiving the wire and holding it down in said upwardly bowed channel.

6. A trolley guide comprising an upper member for positioning the trolley wires and a lower member for guiding a trolley, said upper member having an arm with an upwardly bowed channel in the upper face thereof to receive a trolley wire, said arm having slots therein for holding the wire down in said channel, and another arm at an angle to said first mentioned arm for engaging a second trolley wire.

7. A trolley guide comprising an upper member for positioning the trolley wires and a lower member for guiding a trolley, said upper member having an arm with an upwardly bowed channel in the upper face thereof to receive a trolley wire, said arm having slots extending inwardly from the sides thereof adjacent the ends of said channel for holding said wire down in said slot, and another arm at an angle to said first mentioned arm for engaging a second trolley wire.

8. A trolley guide comprising an upper member for positioning the trolley wires and a lower member for guiding a trolley, said upper member having an upwardly bowed channel in its upper face to receive a trolley wire and having means adjacent the ends of said channel for holding the wire down in said channel, said lower member having upwardly opening channels adapted to receive and grip the trolley wires, the outer portions of said channels serving as runners for the trolley.

9. A trolley guide comprising an upper member for positioning the trolley wires and a lower member for guiding a trolley, said upper member having an arm with an upwardly bowed channel in the upper face thereof to receive a trolley wire, and means formed in said arm for holding said wire down in said slot, and another arm at an angle to said first mentioned arm for engaging a second trolley wire, said lower member having arms similarly positioned with respect to the arms of said upper member, the arms of said lower member having upwardly opening channels adapted to receive and grip the trolley wires, the outer portions of said channels serving as runners for the trolley.

10. A trolley cross-over comprising an upper cross arm member and a lower cross arm member, the cross arms of the upper member having upwardly bowed channels in their upper sides to receive the crossed wires and having means adjacent the ends of the channels for holding the wires down in said channels, the cross arms of the lower member having upwardly opening channels for receiving and gripping the crossed wires, the outer portions of said channels serving as runners for the trolley.

11. A trolley cross-over comprising an upper cross arm member and a lower cross arm member, the cross arms of the upper member having upwardly bowed channels in their upper sides to receive the crossed wires and having slots therein for holding the wires down in said channels, the cross arms of the lower member having upwardly opening channels for receiving and gripping the crossed wires, the outer portions of said channels serving as runners for the trolley.

12. A trolley cross-over comprising an upper cross arm member and a lower cross arm member, the cross arms of the upper member having upwardly bowed channels in their upper faces to receive the crossed wires and having slots extending inwardly from the sides thereof adjacent the outer ends of said upwardly bowed channels for holding the wires down in said channels, the cross arms of the lower member having upwardly opening channels for receiving and gripping the crossed wires the outer portions of said channels serving as runners for the trolley.

13. A trolley cross-over comprising an upper cross arm member and a lower cross arm member, the cross arms of the upper member having upwardly bowed channels in their upper faces to receive the crossed wires and having downwardly facing channels adjacent the outer ends of said arms for receiving the crossed wires and holding them down in said upwardly extending channels, the cross arms of the lower member having upwardly opening channels for receiving and gripping the crossed wires, the outer portions of said channels serving as runners for the trolley.

14. A trolley cross-over comprising an upper cross arm member, and a lower cross arm member, the cross arm of the upper member having upwardly bowed channels in their upper faces to receive the crossed wires and having slots extending inwardly from the sides thereof adjacent the outer ends of said upwardly bowed channels, downwardly facing channels adjacent the outer ends of said arms for receiving the crossed wires and holding them down in said upwardly extending channels, the cross arms of the lower member having upwardly opening channels for receiving and gripping the crossed wires, the outer portions of said channels serving as runners for the trolley.

15. A trolley cross-over comprising an upper cross arm member and a lower cross arm member, the cross arms of the upper member having upwardly bowed channels in their upper sides to receive the crossed wires and having means adjacent the ends of the channels for holding the wires down in said channels, the cross arms of the lower member having upwardly opening channels serving as runners for the trolley, and the portions of said cross arms adjacent the junction being cut away to provide clearance for the flanges of the trolley, said lower cross arms having upwardly opening channeled extensions embracing and gripping the wires and forming approaches to the runner portions whereby said lower member is held in proper assembled position with said upper member.

16. A trolley cross-over comprising an upper cross arm member and a lower cross arm member, the cross arms of the upper member having upwardly bowed channels in their upper sides to receive the crossed wires and having means adjacent the ends of the channels for holding the wires down in said channels, the cross arms of the lower member having upwardly opening channels adapted to receive therein portions extending downwardly from the cross arms of the upper member, the outer portions of said channels serving as runners for the trolley, and the portions of said cross arms adjacent the junction being cut away to provide clearance for the flanges of the trolley, said lower cross arms having upwardly opening channeled extensions embracing and gripping the wires and forming approaches to the runner portions whereby said lower member is held in proper assembled position with said upper member.

17. A trolley cross-over comprising an upper cross arm member and a lower cross arm member, the cross arms of the upper member having upwardly bowed channels in their upper faces to receive the crossed wires and having downwardly facing channel portions adjacent the outer ends of said arms for receiving the cross wires and holding them down in said upwardly bowed channels, the cross arms of the lower member having upwardly opening channels adapted to receive therein said downwardly facing channel portions, the outer portions of said channels serving as runners for the trolley, and the portions of said cross arms adjacent the junction being cut away to provide clearance for the flanges of the trolley, said lower cross arms having upwardly opening channeled extensions embracing and gripping the wires and forming approaches for the runner portions whereby said lower member is held in proper assembled position with said upper member.

18. A trolley switch comprising an upper member for positioning the trolley wires and a lower member for guiding a trolley, the upper member having an upwardly bowed channel in its upper side to receive a trolley wire and having means adjacent the ends of said channel for holding the wire down in said channel, and a portion for securing the free end of a second trolley wire.

19. A trolley switch comprising an upper member for positioning the trolley wires and a lower member for guiding a trolley, the upper member having an upwardly bowed channel in its upper side to receive a trolley wire and having slots extending inwardly from the sides thereof adjacent the ends of said channel for holding the wires down in said slot, and a portion for securing the free end of a second trolley wire.

20. A trolley guide comprising an upper member for fixed attachment to a trolley wire and a lower member for guiding a trolley, said lower member having approach portions for being peened about the wire, said approach portions when peened about the wire alone acting to support and maintain said lower member in position adjacent said upper member.

21. A trolley guide comprising an upper member for fixed attachment to a trolley wire and a lower member for guiding a trolley, said lower member having approach portions extending outwardly beyond said upper member for being peened about the wire, said approach portions when peened about the wire alone acting to support and maintain said lower member in position adjacent said upper member.

22. A trolley guide comprising an upper member for fixed attachment to a trolley wire and a lower member for guiding a trolley, said upper member having downwardly projecting portions and said lower member having provision for receiving said projecting portions, and approach portions for being peened about the wire, said approach portions when peened about the wire alone serving to support and maintain said lower member in position adjacent said upper member.

23. A trolley guide comprising an upper member for fixed attachment to a trolley wire and a lower member for guiding a trolley, said lower member having substantially U-shaped approach portions extending outwardly beyond said upper member for being peened about the trolley wire, and said upper member having downwardly extending portions for fitting into said approaches, said approaches when peened about the wire alone serving to support and maintain said lower member in position adjacent said upper member.

24. A trolley guide comprising an upper member for fixed attachment to a trolley wire and a lower member for guiding a trolley, said lower member having approach portions for being peened about the trolley wire, and said upper member having downwardly projecting portions for frictional engagement with said lower member, said approach portions when peened about the wire and said frictional engagement alone serving to support and maintain said lower member in position adjacent said upper member.

25. A trolley guide comprising an upper member having means thereon for fixedly attaching the upper member to a trolley wire and a lower member for guiding a trolley and being separable from said upper member, said lower member comprising a body portion having approach portions extending therefrom for being peened about the trolley wire, said approach portions when peened about the wire alone serving to support and maintain said lower member in position adjacent said upper member.

26. A trolley guide comprising an upper member for fixed attachment to a trolley wire and a lower member for guiding a trolley, said lower member comprising a main body portion having a substantially flat upper surface and approach portions for being peened about the trolley wire to support said lower member adjacent said upper member said approach portions being rigidly connected to said body portion and extending outwardly beyond said upper member whereby the vibrations of said wire are gradually dampened.

27. A trolley guide comprising an upper member for fixed attachment to a trolley wire and a lower member for guiding a trolley, said lower member comprising a main body portion having a substantially flat upper surface, runner members rigidly connected to said body portion, and approach portions extending outwardly beyond said upper member for being peened about the trolley wire to support said lower member adjacent said upper member rigidly connected to said runner members whereby the vibrations of said wire are gradually dampened.

28. A trolley guide comprising an upper member for fixed attachment to a trolley wire and a lower member for guiding a trolley, said lower member comprising a main body portion having a substantially flat upper surface, runner and approach members extending outwardly beyond said upper member formed integrally and rigidly connected to said body portion, said integrally formed members having upwardly opening channels therein for receiving a trolley wire, the approach portions of said integrally formed members being adapted to be peened about the trolley wire to support said lower member closely adjacent said upper member whereby the vibrations of said wire are gradually dampened.

29. A trolley guide comprising an upper member for fixed attachment to a trolley wire and a lower member comprising a main body portion having a substantially flat surface, runner portions rigidly connected thereto and approach portions extending outwardly of said upper member for being clamped about the wire fixedly connected to said runner members, said runner members and approach portions having upwardly opening channels therein, said upper member having downwardly projecting members for fitting into said runner members whereby when said approach portions are peened about the wire the lower member is supported closely adjacent said upper member with the downwardly projecting portions fitting into said runner members whereby the vibrations of said wire are gradually dampened.

30. A trolley guide comprising an upper member for fixed attachment to a trolley wire and a lower member for guiding a trolley, said lower member comprising a main body portion having approach portions rigidly attached thereto for being peened about the trolley wire, said approach portions extending outwardly beyond said upper member and when peened about the wire alone serving to support and maintain said lower member in position adjacent said upper member and acting to gradually dampen the vibrations of said wire.

31. A trolley guide comprising an upper member for fixed attachment to a trolley wire and a lower member comprising a main body portion, runner portions rigidly connected thereto and approach portions fixedly connected to said runner members extending outwardly beyond said upper member, said runner members and approach portions having upwardly opening channels therein and said upper member having downwardly projecting portions for fitting into said runner members, said approach portions when peened about the wire alone serving to support and maintain said lower member in position adjacent said upper member with the downwardly projecting portions fitting into said runner members and acting to gradually dampen the vibrations of said wire.

RICHARD ROY HOLDEN.